US009310010B2

(12) United States Patent
Cooke

(10) Patent No.: US 9,310,010 B2
(45) Date of Patent: Apr. 12, 2016

(54) INJECTION DEVICE FOR REAGENT

(75) Inventor: Michael Peter Cooke, Gillingham (GB)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 275 days.

(21) Appl. No.: 13/978,186

(22) PCT Filed: Jan. 11, 2012

(86) PCT No.: PCT/EP2012/050366
§ 371 (c)(1), (2), (4) Date: Jul. 3, 2013

(87) PCT Pub. No.: WO2012/095450
PCT Pub. Date: Jul. 19, 2012

(65) Prior Publication Data

US 2013/0269809 A1 Oct. 17, 2013

(30) Foreign Application Priority Data

Jan. 13, 2011 (EP) .................................... 11150858

(51) Int. Cl.
*B05B 1/32* (2006.01)
*F02M 61/08* (2006.01)
(Continued)

(52) U.S. Cl.
CPC ............... *F16L 41/02* (2013.01); *F01N 3/2066* (2013.01); *F02M 61/08* (2013.01); *F02M 61/18* (2013.01);
(Continued)

(58) Field of Classification Search
CPC . F02M 61/18; F02M 61/1833; F02M 61/184; F02M 61/1846; F02M 61/1873; F02M 61/1886; F02M 61/1893; F02M 2610/1453
USPC .......... 137/540, 541, 542; 239/451, 456, 459, 239/533.2, 584, 597, 601
See application file for complete search history.

(56) References Cited

U.S. PATENT DOCUMENTS 308,479 A * 11/1884 Falk et al. ..................... 137/541
1,631,509 A * 6/1927 Baker ........................ 137/515.3
(Continued)

FOREIGN PATENT DOCUMENTS

CN 101248267 A 8/2008
CN 101713319 A 5/2010
(Continued)

OTHER PUBLICATIONS

International Search Report dated Apr. 5, 2012.

*Primary Examiner* — Marina Tietjen
*Assistant Examiner* — Seth W Mackay-Smith
(74) *Attorney, Agent, or Firm* — Thomas N. Zwomey

(57) ABSTRACT

An injection device for administering a reagent into an exhaust passage of an internal combustion engine, the injection device having an axis along its length and comprising an outwardly opening valve member having a seating surface which is engageable with a valve seating region. A seating member provided with an internal bore which defines the valve seating region, wherein the internal bore further defines a flow re-directing region downstream of the valve seating region. The seating member has an end face provided with a feature which intersects with at least a portion of the flow re-directing region to define, together with the flow re-directing region, a spray path for reagent exiting the injection device when the valve member is moved outwardly from the bore away from the valve seating region. The spray path has a variable spray angle, relative to the axis, around the circumference of the valve seating region.

2 Claims, 4 Drawing Sheets

(51) Int. Cl.

| | |
|---|---|
| ***B05B 1/34*** | (2006.01) |
| ***F16L 41/02*** | (2006.01) |
| ***F01N 3/20*** | (2006.01) |
| ***F02M 61/18*** | (2006.01) |

(52) U.S. Cl.
CPC ..... *F01N 2610/02* (2013.01); *F01N 2610/1453* (2013.01); *Y02T 10/24* (2013.01); *Y10T 137/87676* (2015.04)

(56) References Cited

U.S. PATENT DOCUMENTS

| | | | | | |
|---|---|---|---|---|---|
| 2,082,807 | A | * | 6/1937 | Miller | 137/541 |
| 2,313,994 | A | * | 3/1943 | Grant | 239/440 |
| 2,621,078 | A | | 12/1952 | Wahlin | |
| 2,641,509 | A | * | 6/1953 | Yost | 239/597 |
| 2,808,293 | A | * | 10/1957 | Schenk | 239/437 |
| 2,985,386 | A | | 5/1961 | Steinen | |
| 3,584,786 | A | * | 6/1971 | Johnson | 239/568 |
| 3,754,710 | A | * | 8/1973 | Chimura | 239/597 |
| 3,858,812 | A | | 1/1975 | Williams et al. | |
| 4,223,841 | A | * | 9/1980 | Schaller et al. | 239/284.2 |
| 4,252,276 | A | * | 2/1981 | Aprea et al. | 239/391 |
| 5,172,720 | A | * | 12/1992 | Richards | 137/454.5 |
| 5,833,142 | A | * | 11/1998 | Caley | 239/453 |
| 6,192,677 | B1 | | 2/2001 | Tost | |
| 6,261,367 | B1 | * | 7/2001 | Donges | 118/305 |
| 6,345,601 | B1 | * | 2/2002 | Miyajima et al. | 123/305 |
| 6,578,778 | B2 | * | 6/2003 | Koizumi et al. | 239/533.12 |
| 6,675,766 | B2 | * | 1/2004 | Miyajima et al. | 123/298 |
| 6,845,925 | B2 | * | 1/2005 | Abe et al. | 239/533.12 |
| 7,578,450 | B2 | | 8/2009 | Stockner et al. | |
| 7,581,686 | B2 | * | 9/2009 | Holzgrefe et al. | 239/456 |
| 7,703,277 | B2 | | 4/2010 | Ueda et al. | |
| 7,942,349 | B1 | * | 5/2011 | Meyer | 239/585.1 |
| 8,033,099 | B2 | | 10/2011 | Ohshima et al. | |
| 8,079,534 | B2 | * | 12/2011 | Fecht et al. | 239/599 |
| 2004/0075001 | A1 | | 4/2004 | Holzgrefe et al. | |
| 2006/0123771 | A1 | | 6/2006 | Cheng | |
| 2008/0011777 | A1 | | 1/2008 | Cooke | |
| 2010/0077742 | A1 | | 4/2010 | Ehlen et al. | |
| 2011/0239991 | A1 | * | 10/2011 | Straub | 123/476 |

FOREIGN PATENT DOCUMENTS

| | | | |
|---|---|---|---|
| DE | 19856366 | C1 | 4/2000 |
| DE | 102004044820 | A1 | 3/2006 |
| EP | 1878887 | B1 | 4/2009 |
| JP | 4179855 | A | 6/1992 |
| JP | 2006-214388 | | 8/2006 |
| JP | 2007-100672 | | 4/2007 |
| JP | 2008-151087 | | 7/2008 |
| JP | 2010-1817 | | 1/2010 |
| WO | 03/038272 | A1 | 5/2003 |

* cited by examiner

INJECTION DEVICE FOR REAGENT

CROSS REFERENCE TO RELATED APPLICATIONS

This application is a national stage application under 35 U.S.C. 371 of PCT Application No. PCT/EP2012/050366 having an international filing date of 11 Jan. 2012, which PCT application claimed the benefit of European Patent Application No. 11150858.6 filed 13 Jan. 2011, the entire disclosure of each of which are hereby incorporated herein by reference.

TECHNICAL FIELD

The present invention relates to an injection device suitable for administering a reagent into an exhaust chamber or passage of an internal combustion engine, for example to reduce emissions of harmful substances to the atmosphere.

BACKGROUND TO THE INVENTION

Catalytic cleaning processes can be used to partially or completely remove pollutants from the exhaust gas of an internal combustion engine. Specifically, exhaust gas cleaning may be achieved using a reducing agent that reduces one or more pollutants, for example, NOx, in the exhaust gas.

In order to reduce exhaust gas emissions from an internal combustion engine, the reducing agent (e.g. a reagent such as urea solution) can be sprayed into an exhaust passage using an injection device, as shown, for example, in EP1878887. Typically, the activity of the reducing agent is triggered on contact with a catalyst downstream from the point of injection. A Selective Catalytic Reduction (SCR) device performs selective catalytic reduction of nitrogen oxide (NOx) using ammonia (derived from the urea). An injection device, mounted to the passage of an exhaust system, is used to inject the urea into the exhaust flow. A slip catalyst is located downstream of the SCR device to clean up any unreacted ammonia. A diesel particulate filter is also provided to reduce the level of particulate matter and soot that is entrained in the exhaust gas flow and which is not reduced by the SCR device.

It is known for the injection device for reagent to include an outward opening poppet valve to produce a well atomised conical spray. The circular cross section of the projected spray is well suited to the cylindrical shape of the circular exhaust pipe (i.e. having a circular cross section). However, more recently it has been found to be desirable to move the spray point into the exhaust passage closer to the engine in order to allow the SCR catalyst to heat up faster. In order to join the catalysts and the particulate filters in as compact a form as possible, the flow sections of the exhaust passage between them need to be wider in one direction than the other.

It is therefore one object of the invention to provide an injection device which is suitable for injecting a reagent into an exhaust passage having a non-circular cross-section.

SUMMARY OF THE INVENTION

An injection device for administering a reagent into an exhaust passage of an internal combustion engine has an axis along its length and comprises an outwardly opening valve member having a seating surface which is engageable with a valve seating region, and a seating member provided with an internal bore which defines the valve seating region. The internal bore of the seating member further defines a flow re-directing region downstream of the valve seating region. The seating member has an end face provided with a feature which intersects with at least a portion of the flow re-directing region to define, together with the flow re-directing region, a spray path for reagent exiting the injection device when the valve member is moved outwardly from the bore away from the valve seating region. The arrangement of the feature and the flow re-directing region is such that the spray path has a variable spray angle, relative to the device axis, around the circumference of the valve seating region.

The benefit of providing a spray path that is of non-conical form and has a variable spray angle relative to the device axis is that it is compatible for use with an exhaust passage of an SCR system in which flow sections of the exhaust passage have a wider cross section in one direction than the perpendicular direction (i.e. the flow sections are of non-circular section). This enables the spray point into the exhaust passage to be moved closer to the engine because the flow sections that result are well matched by the variable spray angle of the spray path. The benefit of this is that the SCR catalyst, being closer to the engine, is able to heat up faster.

It is particularly advantageous to provide a spray path that is of non-conical form (i.e. with non-circular flow sections) by means of an injection device having an outwardly opening valve member. This is because, in the case of an outwardly-opening valve member, the orifice which sets the velocity of the spray (i.e. the seat gap between the valve seating region and the seating surface of the valve member when the valve member is open) is only open during an injection event. Accordingly, it is less likely to become blocked by exhaust or urea decomposition products (in the case that the reagent is urea solution). Furthermore, the closing movement of the valve member against the valve seating region will tend to crush any deposits which do form, thereby preventing them from building up on the injection device and impairing its function.

Preferably, the valve seating region and the seating surface of the valve member are arranged such that, in use, when the valve member is moved outwardly from the bore away from the valve seating region, the speed and the angle relative to the axis A of a spray of reagent exiting therefrom are substantially uniform around the circumference of the valve seating region. A benefit of this is that there is no significant loss of spray momentum caused by adjusting the spray angle around the circumference of the valve seating region and so good atomisation is maintained.

Advantageously, each of the valve seating region and the seating surface of the valve member is rotationally symmetrical about the axis A. Thus, an injection device is provided which produces a non-circular spray form which does not require machining or fabrication of a rotationally asymmetrical valve seating region or seating surface, which would have an adverse effect on the ease of manufacture of the device as well as cost and fabrication time.

In one example, the flow re-directing region is re-entrant and, in addition or alternatively, may be spherical or radiussed.

The valve seating region defined by the internal bore and the seating surface of the valve member are preferably conical. Alternatively, the valve seating region may have a spherical or radiussed form and the seating surface of the valve member may have a complementary shape.

In one embodiment, the feature provided in the end face of the seating member takes the form of a groove or recess. For example, the groove may be curved, triangular or rectangular.

In one embodiment, the valve seating region defines a seating angle with the device axis, the groove being shaped such that the spray path for reagent exiting the injection device at the bottom of the groove exits at substantially the same angle as the seating angle and the spray exiting the injection device at the top of the groove exits at a smaller angle than the seating angle.

The groove may be shaped such that the spray path for reagent exiting the injection device is elliptical.

In another embodiment the feature is a raised region provided on the end face of the seating member.

It may be preferable for the end face of the seating member to include an angled region which is angled relative to the device axis. In one example, the end face of the seating member may include a further region which is substantially perpendicular to the device axis, and wherein the circumference of intersection between the angled region and the further region defines an elliptical path about the device axis.

In a preferred embodiment, the end face of the seating member defines an intersection edge with the internal bore which is acute at least a part of the way around the circumference (and which may be acute substantially all the way around the circumference). This provides the advantage that the chance of spray deposits being formed on the end face is minimised.

In other embodiments, it may be that the acute edge is substantially non-existent at diametrically opposed points around the circumference of intersection.

The injection device may further comprise a spring for biasing the valve member against the valve seating region so as to halt delivery of reagent. The spring preferably sets the opening pressure for the device, at which the valve member is caused to move outwardly from the internal bore, away from the seating region.

The seating member may be integrally formed with the device housing, or may be a separate part secured to the device housing in a fixed manner.

The invention is particularly suitable for use in delivering reagent to an exhaust passage in an internal combustion engine for the purpose of selective catalytic reduction, but may have other applications in combustion engines also.

BRIEF DESCRIPTION OF THE DRAWINGS

The invention will now be described, by way of example only, with reference to the following Figures in which.

DETAILED DESCRIPTION OF THE DRAWINGS

Figure 1:
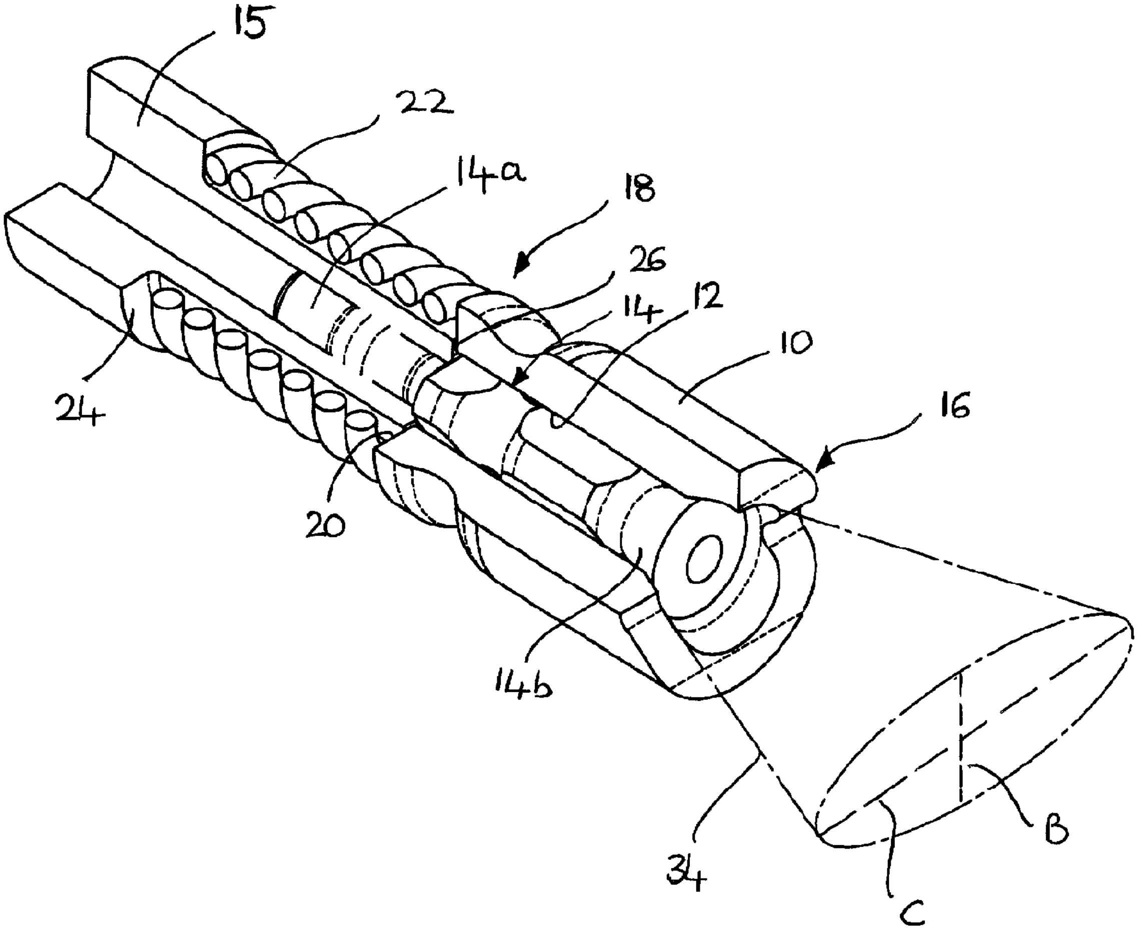
FIG. 1 is a perspective view of an injection device of a first embodiment of the invention.

FIG. 1 shows an injection device for use in delivering a reagent such as urea solution into an exhaust passage of an SCR dosing system. The SCR dosing system is of the type used in a compression ignition internal combustion engine and delivers a reagent into the exhaust flow so as to perform selective catalytic reduction of nitrogen oxide (NOx) using ammonia (e.g. derived from the urea source).

The injection device includes a device housing (not shown) within which a seating component or seating member 10 is received in a fixed manner. The seating component 10 is provided with an internal bore 12 within which a valve member 14 of the device is received. The internal bore 12 is composed of cylindrical, conical and/or spherical sections. The device 10 has an axis A (as indicated in FIG. 2) along its length.

The seating component 10 has a first, injecting end 16, in the vicinity of which urea exits the device into the exhaust passage. A second, upper end 18 of the seating component is remote from the injecting end 16 and defines a first abutment surface 20 for a spring 22. The valve member 14 is stepped along its length to define two distinct regions: a lower region of enlarged diameter that cooperates with the injecting end 16 of the seating component (as described in further detail below) and an upper region of reduced diameter which forms a stem **14*a* which is received in a press-fit within a lift stop member 15. The lift stop member 15 defines a second abutment surface for the spring 22 in the form of a step 24 towards its upper end and a lift stop feature 26 which limits the maximum extent of opening movement of the valve member 14 by engagement with the first abutment surface 20 for the spring 22. The spring 22, being engaged between the first and second abutments surfaces 20, 24**, sets an opening pressure for the device in a known manner, and as described, for example, in the Applicant's European Patent No. 1878887.

Figure 2:
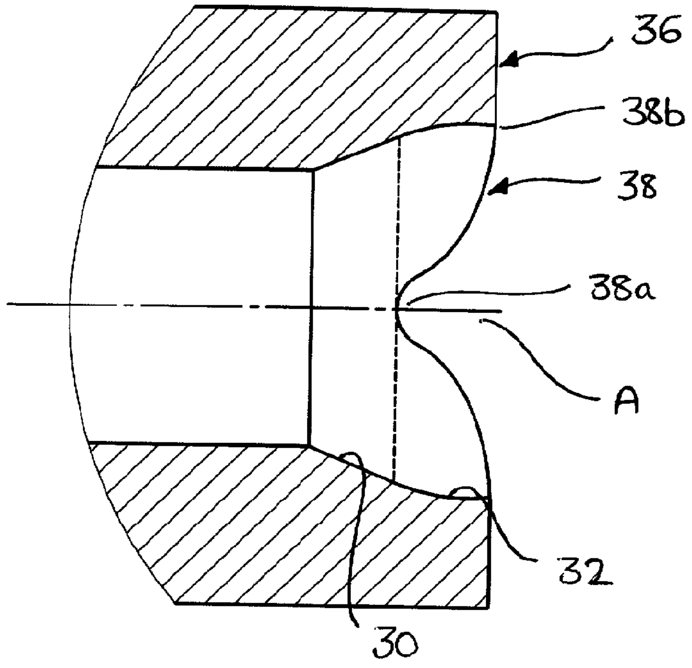
FIG. 2 is a section view of a seating component forming part of the injection device in FIG. 1.

As can be seen most clearly in FIG. 2, at the injecting end 16 of the seating component 10 the internal bore 12 defines a seating region 30 which, in the embodiment shown, is of generally conical form. In another embodiment (not shown), the seating region of the internal bore need not be of conical form but may be another shape having rotational symmetry about the axis of the device (e.g. spherical or radiussed). In a similar manner, the valve member 14 need not be of conical form at its region that engages with the seating region 30 but may be of a complementary shape to the seating region, again having rotational symmetry about the axis of the device.

A generally conical seating surface of the valve member **14*b* is engageable with the seating region 30 so as to control the delivery of reagent from the device into the exhaust passage. The engagement between the conically formed seating surfaces ensures there is an accurate seal between the components when the valve member 14** is closed.

Downstream of the seating region 30, the internal bore 12 of the seating component 10 defines a flow re-directing region 32 which defines, together with the outer surface of the valve member 14, a spray path for reagent when the valve member is moved outwardly from the device, away from the seating region 30. In the embodiment shown, the flow re-directing region 32 is spherical about the axis A of the device or, in an alternative embodiment, may be radiussed. The spray pattern emerging from the injecting device is illustrated in FIG. 1 and is identified by reference numeral 34.

An end face 36 of the seating component 10 is provided with a feature in the form of a groove 38 which intersects with the flow re-directing region 32 at two diametrically opposed positions around the circumference of the internal bore 12. The arrangement of the groove 38 and the flow re-directing region 32, and the manner in which they intersect, results in the spray exiting the device being re-directed by a variable amount around the circumference of the seating component 10. This results in a spray pattern 34 having a non-circular shape around the circumference of the seating component 10. In the example shown in FIGS. 1 and 2, the exiting spray pattern 34 has a non-circular, elliptical section about the axis A i.e. a greater cross section in a first direction perpendicular to the axis A compared with a smaller cross section in a second, direction perpendicular to the first direction.

In more detail, the groove 38 in the end face of the seating component 10 has a bottom region **38*a*, being the well of the groove, and a top region 38*b* which breaks out at the end surface 36. The groove 38 is shaped such that the spray exiting the device at the bottom region 38***a* of the groove exits at a similar angle to the cone angle of the seating region 30, whereas the spray exiting the groove at the top region 38*b* is re-directed to be closer to the axis A of the device. This provides a spray pattern 34 having a fan-shaped or generally ellipse-like profile, as seen in FIG. 1, with a minor axis B that is smaller than a perpendicular major axis C.

If the flow re-directing region 32 is re-entrant, as shown in FIG. 2, part of the spray exiting the device is redirected so as to be focussed onto a point in front of the device. In practice the effect of this is that the spray pattern immediately at the exit of the device adopts an elliptical spray shape, with the spray relatively close to the exit but further into the exhaust passage adopting a figure-of-eight like profile. The spray pattern returns to a more elliptical spray shape as the sprays along the B axis converge still further into the exhaust passage. The elliptical nature of the spray pattern 34 immediately at the exit of the device is shown clearly in the illustration of FIG. 1.

In the following figures, similar parts are identified with like reference numerals to those shown in FIGS. 1 and 2.

Figure 3:
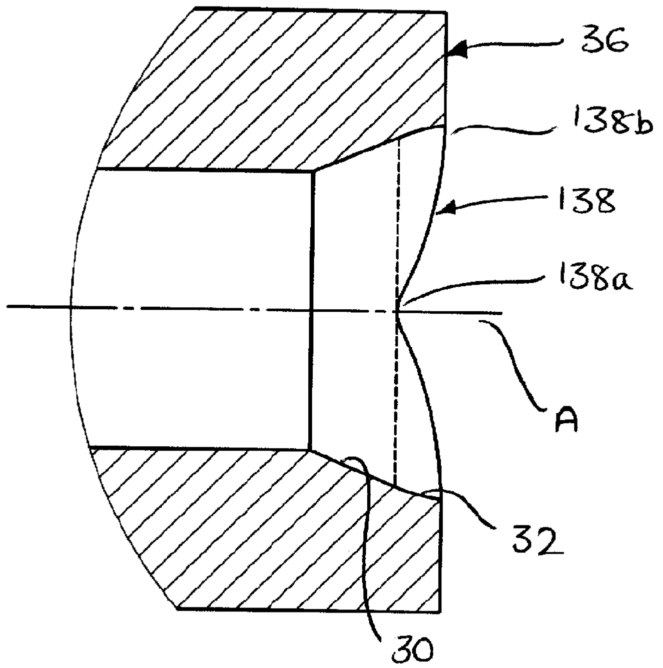
FIGS. 3 to 8 are section views of alternative seating components for use in the injection device in FIG. 1.

In an alternative embodiment, as shown in FIG. 3, the groove 138 is less deep and has a more open and shallower form (i.e. the bottom region 138*a* of the groove 38 is closer to the top region 138*b* of the groove). This provides a spray pattern with similar characteristics to the elliptical spray pattern shown in FIG. 1, except that the dimension of the minor axis B is increased (and the ratio of the minor B axis to the major axis C is increased).

Figure 4:
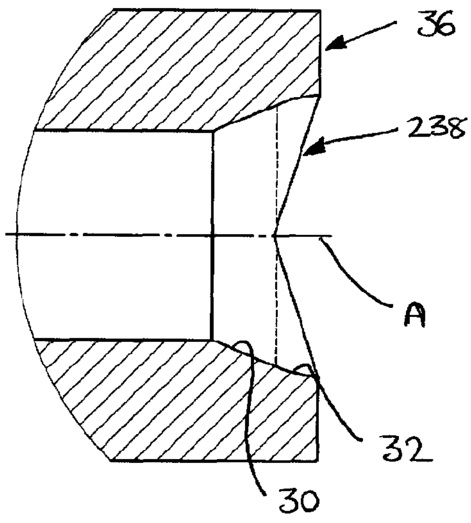
Figure 5:
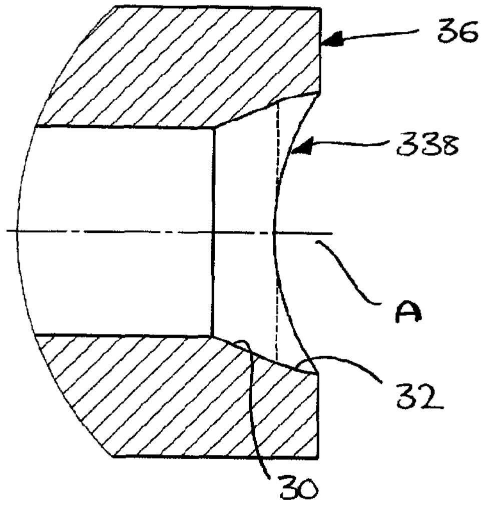
Figure 6:
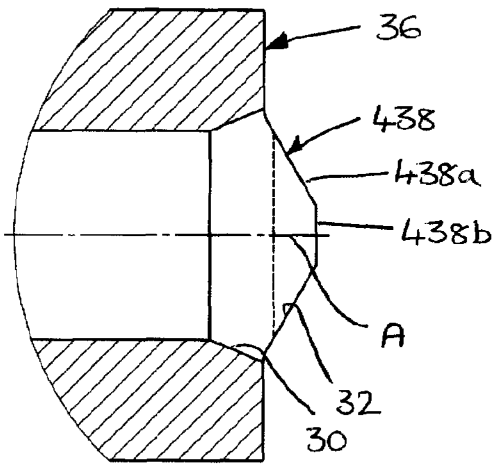

The grooved shaping of the end face 36 of the seating component 10 in FIGS. 1 to 3 gives a particularly even spray formation both close to the seating region 30 and at a significant distance from the seating region 30. Other shapes for the end face 36 of the seating component 10 are also envisaged. For example, in FIG. 4 the groove 238 is of triangular form and, in FIG. 5, the groove 338 is curved. In a further alternative embodiment, as shown in FIG. 6, the groove is replaced with a raised region 438. The raised region 438 has an angled surface 438*a* around its circumference and terminates in a flat plateau 438*b*.

The embodiments of FIGS. 1 to 3 will produce an even distribution (volume density) of spray around the circumference of the spray pattern close to the seating region 30, whereas at a significant distance from the seating component 10 it is the spray direction that is modified by the particular shape of the groove.

Figure 7:
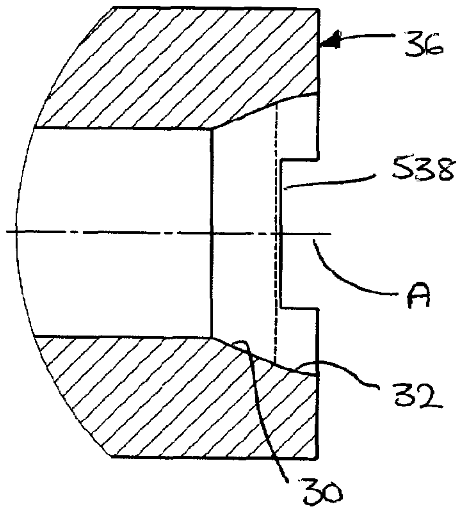

If an even distribution is not important, and only the aspect ratio between perpendicular axes of the spray, three or four distinct spots of spray can be formed by a simple rectangular groove 538, as shown in FIG. 7. In FIG. 7, it will be appreciated that the surface of the seating component 10 immediately adjacent to the groove 538 is flush with the end surface 36 and therefore effectively forms an extension of it.

By way of example, if there is a short straight section of exhaust passage between the spray point into the passage and the catalyst, the nature of the distribution is particularly important. If there is a downstream mixer (i.e. a feature that creates turbulence in the exhaust flow) and/or a long exhaust passage section beyond the spray point and/or a twisted passage beyond the spray point, the spray pattern distribution may be less important although it will still be important to avoid spraying onto the walls of the exhaust passage.

Figure 8:
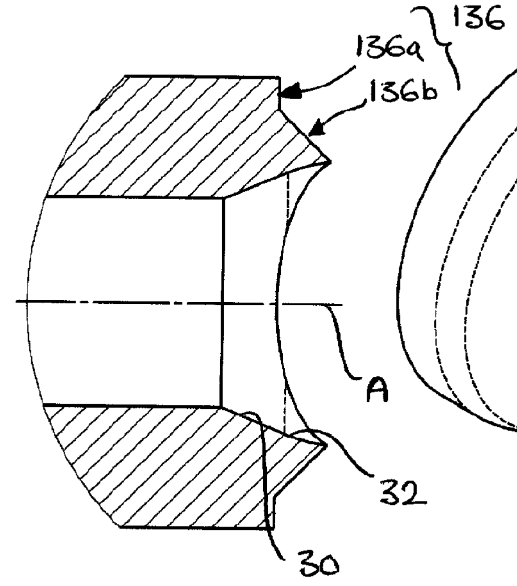
Figure 9:
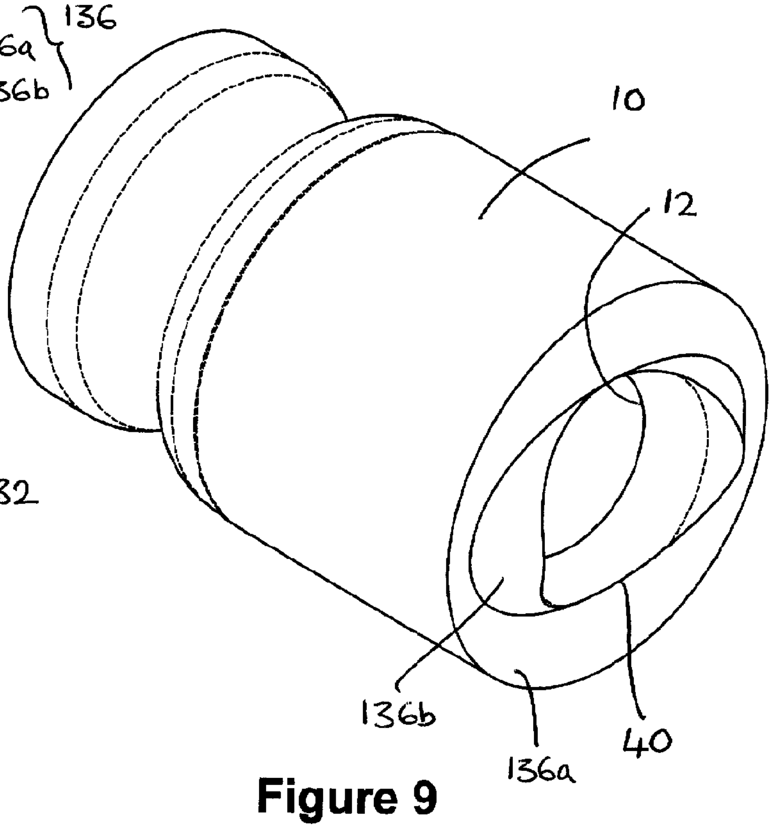
FIG. 9 is a perspective view of the seating component in FIG. 8.

The shape of the end surface 36 of the seating component 10 can be formed by means of known processes, such as grilling, milling or wire eroding, With more advanced techniques such as CNC (Computer Numerical Control) controlled machinery, other shapes for the end surface 36 are also possible. FIGS. 8 and 9 show an example in which the end face 136 includes two distinct regions; a first region 136*a* which is perpendicular to the device axis A and a second region 136*b* which is angled with respect to the device axis A. The circumference of intersection between the angled surface 136*b* and the first region 136*a* of the end surface follows an elliptical path around the circumference of the internal bore 12 of the seating component 10, as can be seen most clearly in FIG. 9. In this embodiment, the internal bore 12 of the seating component 10 and the angled region 136*b* of the end face 136 define an intersection edge 40 that is acute at all points around its circumference, thereby minimising the chance of spray deposits being formed on the end face 136. The angled surface 136*b* becomes substantially non-existent at diametrically opposed points around the circumference of the internal bore 12.

In each of the foregoing embodiments described with reference to FIGS. 1 to 9, the seating region 30 of the seating component 10 is rotationally symmetrical about the axis of the device. Likewise, the seating surface of the valve member 14 which cooperates with the seating region 30 is rotationally symmetrical about the axis of the device. With this configuration, the orifice or gap which is produced between the seating region 30 and the seating surface when the valve member 14 is moved outwardly from the internal bore 12 is also rotationally symmetrical. Accordingly, the velocity (i.e. the speed and the angle relative to the axis A) that generates the atomised spray is the same all of the way around the circumference of the seating region 30. Subsequently, as the spray moves downstream across the flow re-directing region 32 it is redirected so as to produce the non-circular spray form which exits the device.

Thus, by means of the flow re-directing region 32 positioned downstream from the valve member 14 a non-circular spray is advantageously produced without the need to modify the seating region 30 or the seating surface of the valve member 14. In particular, the rotational symmetry of both the seating region 30 and the seating surface of the valve member 14 is preserved which simplifies the manufacture of these components compared with arrangements having rotational asymmetry because circular cross-sections are generally easier to machine/fabricate. The rotational symmetry of the valve seating region 30 and of the seating surface of the valve member 14 also facilitates the formation of a good seal therebetween when the valve member 14 is in the closed position.

The invention claimed is:

1. An injection device for administering a reagent into an exhaust passage of an internal combustion engine, the injection device having an axis (A) along its length and comprising:

an outwardly opening valve member having a seating surface which is engageable with a valve seating region; and a seating member provided with an internal bore which defines the valve seating region, wherein the internal bore further defines a flow re-directing region downstream of the valve seating region; and wherein the seating member has an end face provided with a feature which intersects with at least a portion of the flow re-directing region to define, together with the flow re-directing region, a spray path for reagent exiting the injection device when the valve member is moved outwardly from the bore away from the valve seating region, wherein the spray path has a variable spray angle, relative to the axis A, around the circumference of the valve seating region, wherein the end face of the seating member includes an angled region which is angled relative to the axis (A) of the injection device, wherein the end face of the seating member includes a further region which is substantially perpendicular to the device axis (A), and wherein a circumference of intersection between the angled region and the further region defines an elliptical path about the device axis (A).

2. An injection device for administering a reagent into an exhaust passage of an internal combustion engine, the injection device having an axis (A) along its length and comprising:

an outwardly opening valve member having a seating surface which is engageable with a valve seating region; and a seating member provided with an internal bore which defines the valve seating region, wherein the internal bore further defines a flow re-directing region downstream of the valve seating region; and wherein the seating member has an end face provided with a feature which intersects with at least a portion of the flow re-directing region to define, together with the flow re-directing region, a spray path for reagent exiting the injection device when the valve member is moved outwardly from the bore away from the valve seating region, wherein the spray path has a variable spray angle, relative to the axis A, around the circumference of the valve seating region, wherein the end face of the seating member includes an angled region which is angled relative to the axis (A) of the injection device, wherein the end face of the seating member and the internal bore define a circumference of intersection which forms an acute edge at least a part of the way around said circumference, wherein the acute edge is non-existent at diametrically opposed points around the circumference of intersection.

* * * * *